United States Patent
Herbster et al.

(10) Patent No.: US 7,831,365 B2
(45) Date of Patent: Nov. 9, 2010

(54) RATIO CONTROL METHOD FOR A CONTINUOUSLY VARIABLE TRANSMISSION

(75) Inventors: Kai-Uwe Herbster, Friedrichshafen (DE); Peter Spörl, Ravensburg (DE); Oliver Iden, Weissensberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/894,430

(22) Filed: Aug. 21, 2007

(65) Prior Publication Data

US 2008/0004781 A1 Jan. 3, 2008

Related U.S. Application Data

(62) Division of application No. 10/985,296, filed on Nov. 10, 2004, now abandoned.

(30) Foreign Application Priority Data

Nov. 19, 2003  (DE)  ................. 103 53 978

(51) Int. Cl.
*G06F 19/00*   (2006.01)
*B60W 10/02*   (2006.01)
(52) U.S. Cl. ......................... 701/58; 701/70
(58) Field of Classification Search ................ 701/51, 701/52, 61, 58, 54, 70, 79, 85, 94, 95, 99, 701/110; 477/37, 52, 41, 34; 474/8, 18, 474/28; 60/487; 475/52, 72
See application file for complete search history.

(56) References Cited

U.S. PATENT DOCUMENTS

| 4,919,097 | A  |  | 4/1990 | Mitui et al. |
| 6,178,372 | B1 |  | 1/2001 | Tabata et al. |
| 6,311,113 | B1 |  | 10/2001 | Danz et al. |
| 7,217,214 | B2 | * | 5/2007 | Morscheck ................. 475/211 |
| 7,329,206 | B2 | * | 2/2008 | Tanaka ........................ 477/176 |
| 7,371,204 | B2 | * | 5/2008 | Reuschel et al. ............... 477/45 |
| 2004/0235595 | A1 |  | 11/2004 | Luh |
| 2005/0021222 | A1 |  | 1/2005 | Minami et al. |
| 2005/0197234 | A1 | * | 9/2005 | Reuschel et al. ............... 477/41 |
| 2005/0227809 | A1 | * | 10/2005 | Bitzer et al. ................... 477/37 |

FOREIGN PATENT DOCUMENTS

DE   198 02 075 A1   7/1999

* cited by examiner

*Primary Examiner*—Ronnie Mancho
(74) *Attorney, Agent, or Firm*—Davis & Bujold, P.L.L.C.

(57) ABSTRACT

A method for adjusting a ratio of a continuously variable automatic transmission where a nominal ratio is determined according to an accelerator pedal signal value. The nominal ratio is determined according to a modified accelerator pedal signal. When the periodic curve of the accelerator pedal signal has a relative extreme value to the modified accelerator pedal signal, a starting value is assigned which is equal to this extreme value. Until the value of the modified accelerator pedal signal is again equal to the value of the unmodified accelerator pedal signal, the value of the modified accelerator pedal signal is determined by a transfer function.

6 Claims, 9 Drawing Sheets

RATIO CONTROL METHOD FOR A CONTINUOUSLY VARIABLE TRANSMISSION

This application is a divisional application of U.S. patent application Ser. No. 10/985,296 filed Nov. 10, 2004, which claims priority from German Patent Application Serial No. 103 53 978.6 filed Nov. 19, 2003.

FIELD OF THE INVENTION

The invention concerns a ratio control method for a continuously variable automatic transmission.

BACKGROUND OF THE INVENTION

Both in continuously variable and in infinitely variable automatic transmission, it is normal to adjust a certain gear or a certain ratio of a transmission control depending on an accelerator pedal signal which is fed to the electronic transmission control. In case of infinitely variable automatic transmissions, any ratio can be adjusted within a preset ratio range. This can result in any change of the accelerator pedal signals, however small, leads to a change of the adjusted ratio. Driving situations exist in which this leads to undesired ratio adjustments and thus to undesired rotational speed curves of the prime mover. A situation in which such an undesired rotational speed variation often occurs is the following.

In a drive at constant velocity, a driver continues to depress the accelerator pedal in order to accelerate. At the end of this accelerator pedal movement, the driver often goes light on the gas, that is, he moves again the accelerator pedal in the other direction so that a corresponding change of the accelerator pedal signal is also produced. The consequence of this is that the rotational speed curve of the prime mover has an overshoot not plausible for the driver since the gas release occurs involuntarily. Such an effect does not occur in continuously variable automatic transmission since the gear is always the same within a certain range of the accelerator pedal signal, that is, the same transmission ratio.

Control methods for continuously variable automatic transmission are known in which only discrete ratio steps are inserted so as to simulate the behavior of a continuously variable automatic transmission. Allowance must, of course, be made for the disadvantage that the prime mover—the same as in multi-speed automatic transmissions—often is not operated in the optimal operating range.

The problem on which the invention is based is to outline a method for adjusting a ratio of a continuously variable automatic transmission in which the above mentioned undesired rotational speed change of the prime mover does not occur without allowance having to be made for the disadvantages of a system which simulates the behavior of a multi-speed automatic transmission.

SUMMARY OF THE INVENTION

In the method for ratio adjustment of a continuously variable automatic transmission with an adjustable variator for a motor vehicle actuatable by a prime mover with an electronic transmission control which comprises a control unit with a microcomputer which is connected with sensors and/or external control units for detecting operating parameters and with adjustment means which, depending on control signals of the electronic transmission control, adjust a specific ratio in the variator. An accelerator pedal signal is fed to the control unit and, depending on the accelerator pedal signal in the control unit, a nominal ratio is detected, which is adjusted by the adjustment means on the variator, according to the invention. Therefore, from the accelerator pedal signal in the control unit, a modified accelerator pedal signal is determined on the basis of which the nominal ratio is determined. It is tested whether the periodic course of the accelerator pedal signal has a relative extreme value, that is, a relative minimum or a relative maximum. In case such a relative extreme value is detected, to the modified accelerator pedal signal, departing from a start in which it is equal to the unmodified accelerator pedal signal, a starting value is assigned which is equal to the extreme value. The value of the modified accelerator pedal signal is subsequently determined by a transfer function until the value of the modified accelerator pedal signal is again equal to the value of the unmodified accelerator pedal signal.

In relation to the above described drive situation, it is achieved that in case of a vehicle acceleration with subsequent gas release, after a maximum value of the unmodified accelerator pedal signal has been detected, the transmission ratio, at least briefly, is determined not with reference to said unmodified accelerator pedal signal value but with reference to the modified accelerator pedal signal formed from the transfer function. The transfer function can be configured so that there appears a desired rotational speed change of the prime mover plausible for the driver.

In an advantageous development of the invention, the modified accelerator pedal signal value determined from the transfer function is not greater than the sum of the unmodified accelerator pedal signal value and a maximum positive divergence and not smaller than the sum of the unmodified accelerator pedal signal value and a maximum negative divergence. The consequence of this is that great changes of the unmodified accelerator pedal value, in every case, effect also a corresponding change of the modified accelerator pedal signal value. Therefore, every significant actuation of the accelerator pedal by the driver also has a corresponding reflection upon the modified accelerator pedal signal and thus upon the transmission ratio that appears while small changes of the unmodified accelerator pedal signal value, which are often produced by an involuntary slight actuation of the accelerator pedal, do not have immediately to result in a change of ratio.

In one development of the inventive method, the modified accelerator pedal signal value determined by the transfer function is set equal to the starting value—that is, to the detected extreme value—until the maximum positive or maximum negative divergence is reached or until the unmodified accelerator pedal signal value is again equal to the starting value. An advantageous possibility of again equating the modified accelerator signal value with the unmodified accelerator pedal signal value is given by the fact that the modified accelerator pedal signal value is again suddenly set equal to the unmodified accelerator pedal signal value when the maximum positive or the maximum negative divergence has been reached.

In an alterative method, the modified accelerator pedal signal value determined by the transfer function, beginning with the starting value—that is, with the extreme value— changes rigidly monotonically in direction of the unmodified accelerator pedal signal value until the modified accelerator pedal signal value is again equal to the unmodified accelerator pedal signal value. Hereby a gradual approximation is reached and a jump is prevented. The signal curve of the modified accelerator pedal signal can assume the form of every rigidly monotonically ascending or descending curve. Especially easily applicable is a linear curve in which the modified accelerator pedal signal value drops linearly with a presettable gradient when the modified accelerator pedal signal value is greater than the unmodified accelerator pedal signal value and the difference between the two accelerator pedal signal values is smaller than the maximum positive divergence. The maximum positive or negative divergence is not exceeded. Therefore, when the maximum divergence is reached, the velocity of change of the modified accelerator pedal signal value is determined by the velocity change of the unmodified accelerator pedal signal value.

BRIEF DESCRIPTION OF THE DRAWINGS

The invention will now be described, by way of example, with reference to the accompanying drawings in which.

DETAILED DESCRIPTION OF THE INVENTION

Figure 8A:
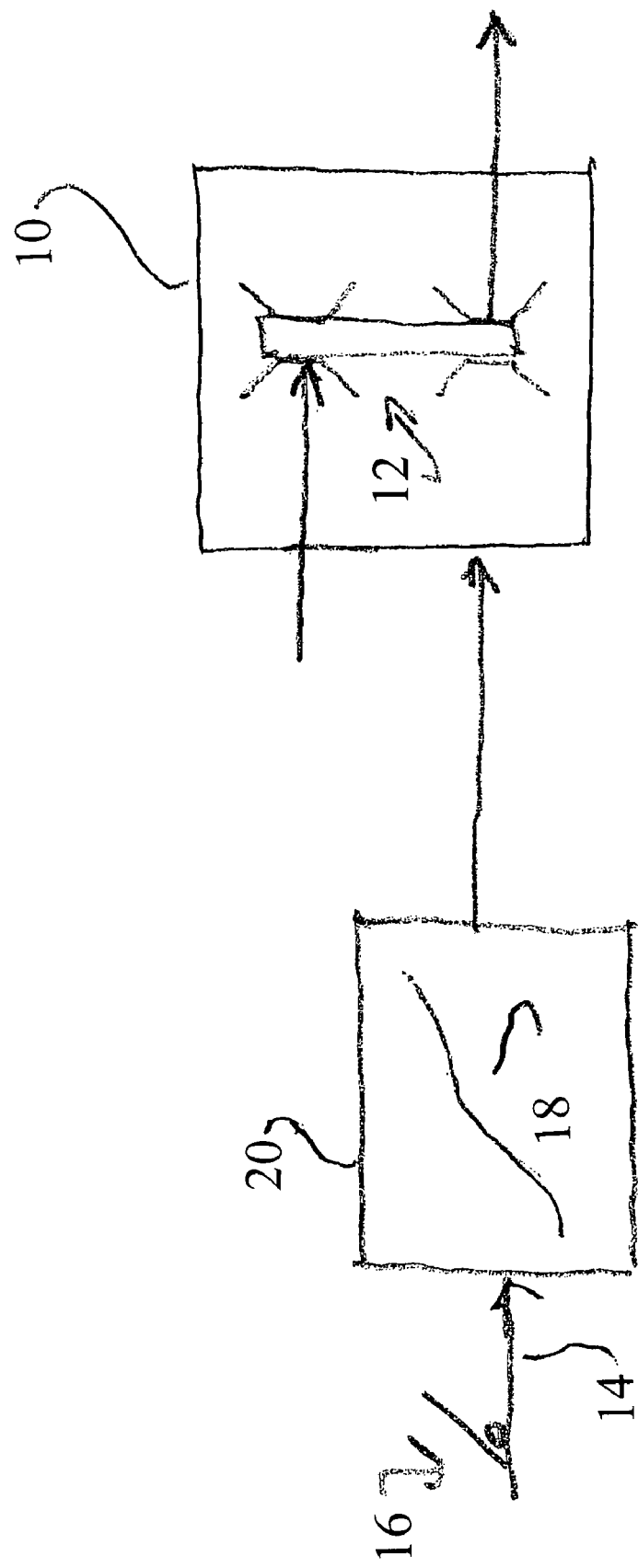
FIG. 8A is a block diagram illustrating a transmission and control system of the present invention.

FIG. 8A is a block diagram illustrating a transmission and control system of the present invention showing a continuously variable transmission (CVT) 10 where torque and speed are transferred through the transmission 10 at a ratio determined by a variator 12 and where the variator ratio is controlled by an input signal 14 from an accelerator pedal 14 that is provided to and modified to control the variator 12 by a transfer function 18 of an electronic transmission control 20 that, in turn, provides a modified accelerator control pedal signal 22 to the transmission 10 to control the variator 12.

Figure 8B:
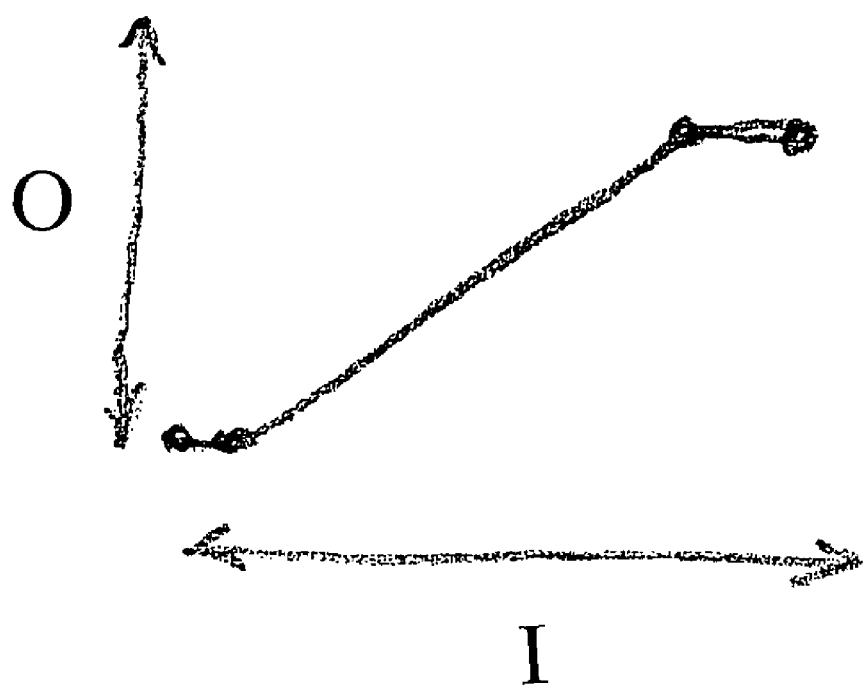
FIG. 8B is a diagrammatic representation of the input/output torque/speed curve at all points across the range of ratios of a variator.

FIG. 8B, in turn, is a diagrammatic representation of the input/output torque/speed curve at all points across the range of ratios of a variator.

In each Figure, the curve of the unmodified accelerator pedal signal is shown as solid lines (U) and the curve of the modified accelerator pedal signal as dotted line (M). At the moment t_10, the driver begins to depress the accelerator pedal. Corresponding with the movement of the accelerator pedal, the value of the accelerator pedal signal also changes, that is, it rises. At the moment t_11, a maximum value of the accelerator pedal signal is attained or exceeded. This is detected by the electronic transmission control. Departing from the state prevailing up to the moment t_11 in which the value of the modified accelerator pedal signal is equal to the value of the unmodified accelerator pedal signal, a starting value f_start1 is assigned to the modified accelerator pedal signal value which is equal to the detected extreme value. Up to the moment t_12, the value of the modified accelerator pedal signal is determined by a transfer function. The modified accelerator pedal signal value determined by the transfer function is equal to the starting value up to the moment t_12 when a maximum positive divergence of the modified accelerator pedal signal value, compared to the unmodified accelerator pedal signal value, is reached. At this moment t_12, the modified accelerator pedal signal value is suddenly set again equal to the unmodified accelerator pedal signal value and, in the further curve between the moments t_12 and t_13, the modified accelerator pedal signal value is again equal to the unmodified accelerator pedal signal value. For the ratio adjusted in the continuously variable transmission, the consequence of this is that the actuation of the accelerator pedal involuntarily occurring under certain circumstances between the moments t_11 and t_12 remains without effects. Only when at the moment t_12, the release of the accelerator pedal by the driver is significant enough to conclude on its basis that it has been voluntarily effected does there then also result a corresponding reaction of the transmission. In this case, therefore, at the moment t_12, a longer transmission ratio is introduced so that the rotational speed drops. Beginning with the moment t_12, the reverse case is shown in which the driver first releases the accelerator pedal and then, at the t_13 moment, again depresses it. At the moment t_13, the traversing of a relative minimum is also detected here and to the modified accelerator pedal signal a transfer function assigns the constant value f_start3 which is maintained up to the moment t_14.

Figure 1:
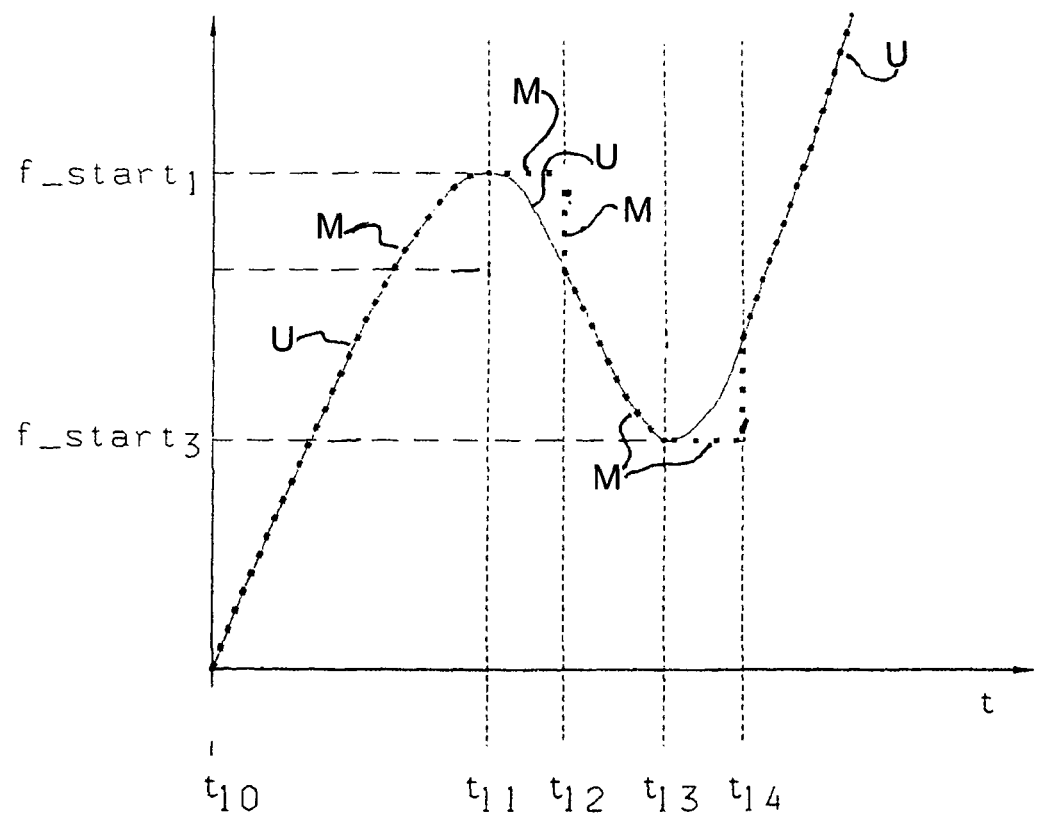
FIGS. 1 to 4 show signal curves of the unmodified and of the modified accelerator pedal signal in a first transfer function.
Figure 2:
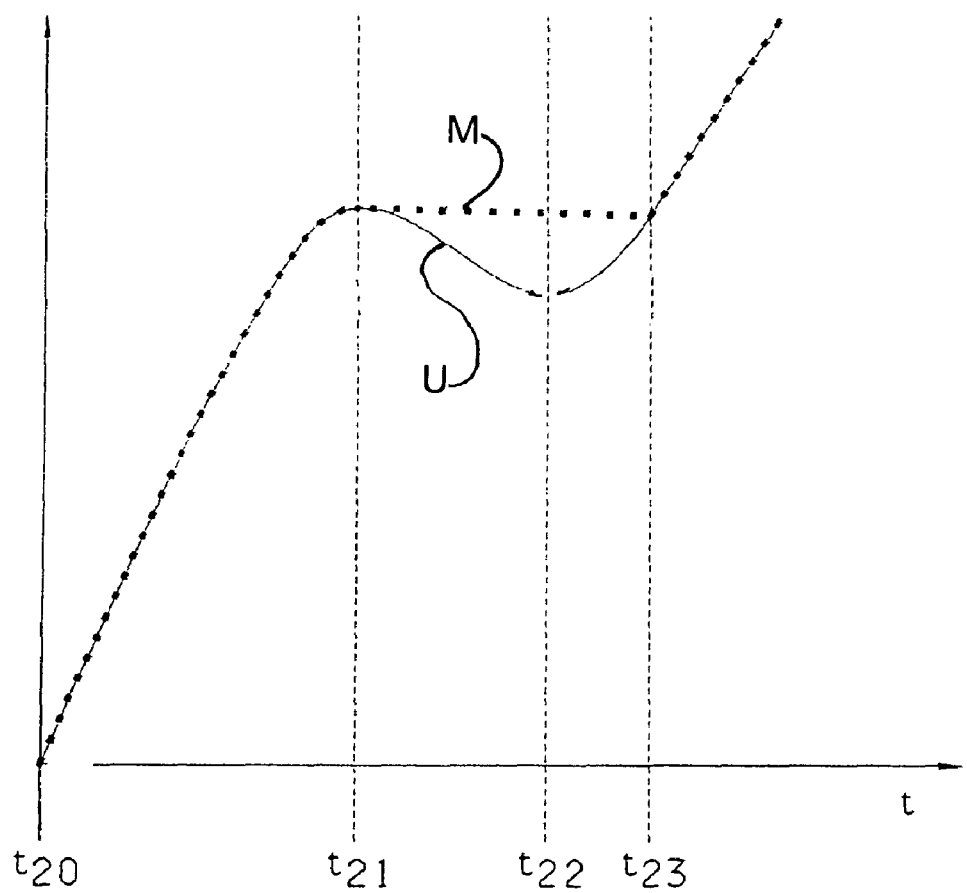

The signal curve, shown in FIG. 2, is equal in the first phase to the curve shown in FIG. 1. After the maximum value at the moment t_21 has been detected, the maximum positive divergence from each other of the two signal values, of course, has not been reached so that there results no sudden return of the modified accelerator pedal signal value to the unmodified accelerator pedal signal value as at the moment t_12 in FIG. 1. Instead of this, the transfer function at the moment T-23 is terminated by the unmodified accelerator pedal signal value being again equal to the until then constantly issued modified accelerator pedal signal value which corresponds to the starting value.

Figure 3:
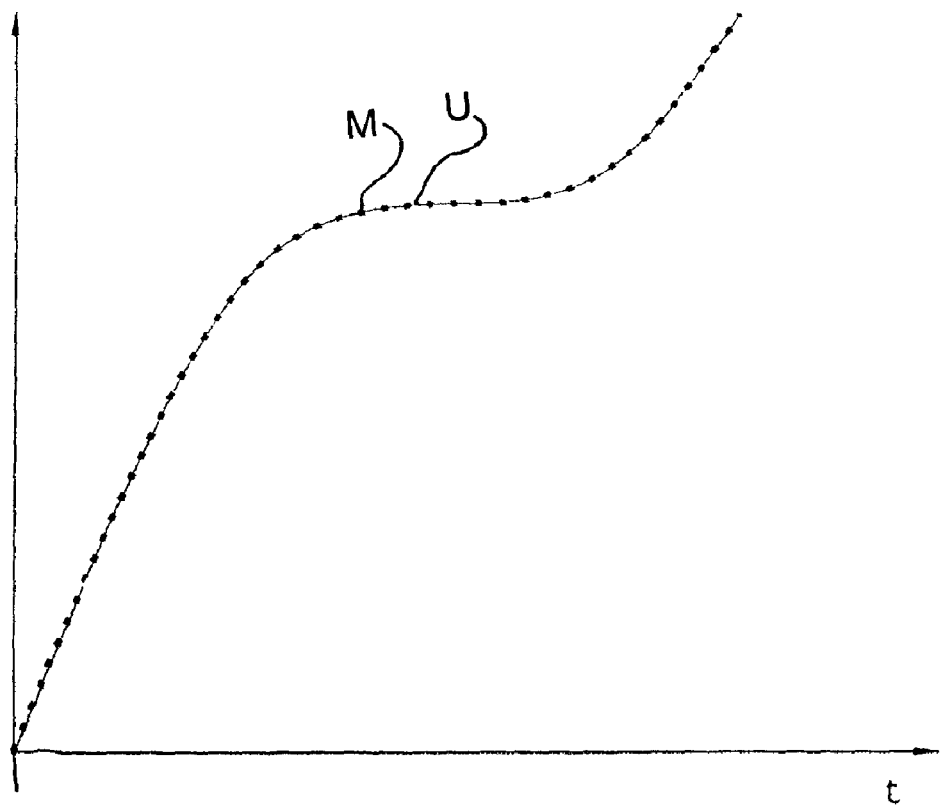

In the signal curve shown in FIG. 3, the unmodified accelerator pedal signal is steadily equal to the modified accelerator pedal signal, since the releasing phenomenon (the detection of the relative extreme value) does not occur.

Figure 4:
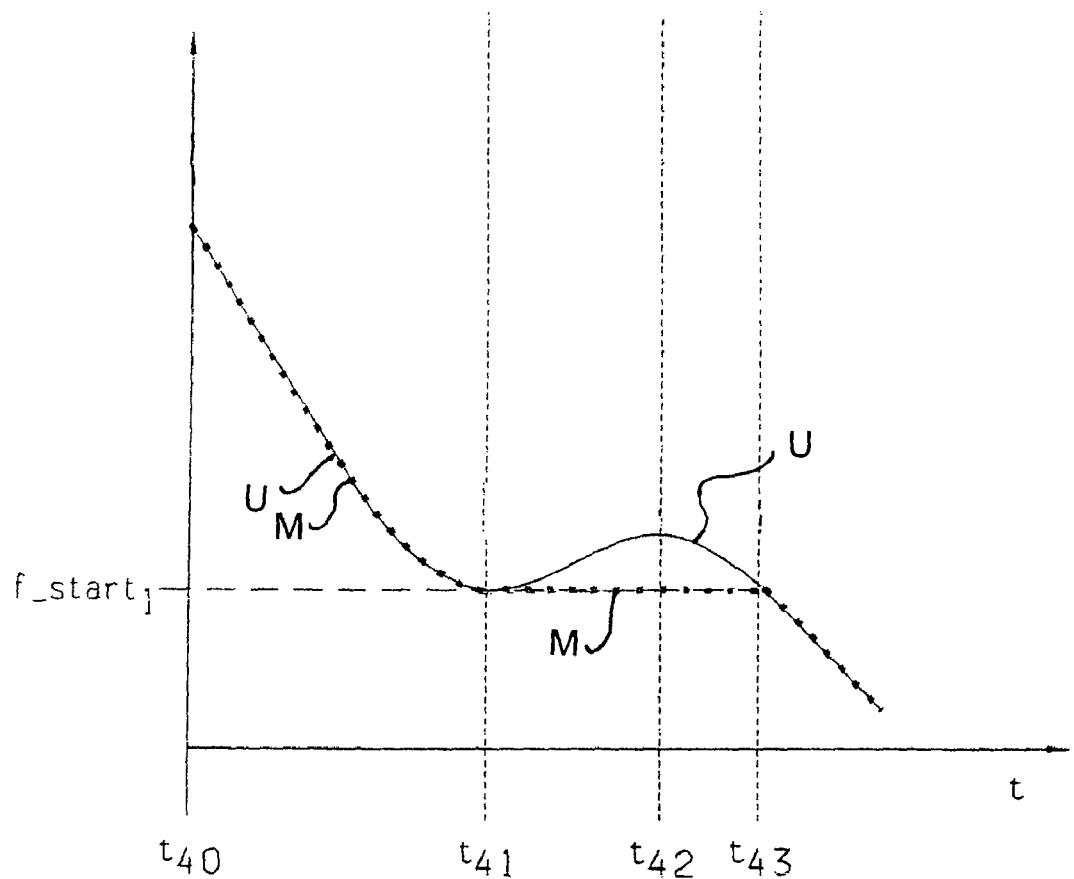

FIG. 4 shows the case opposite to FIG. 2 in which the driver releases the accelerator pedal from the moment t_40 to the moment t_41 and between t_41 and t_43 somewhat depresses it. The maximum divergence is not attained here, so that between t_41 and t_43, the constant starting value f_start1 is issued for the modified accelerator pedal signal.

Figure 5:
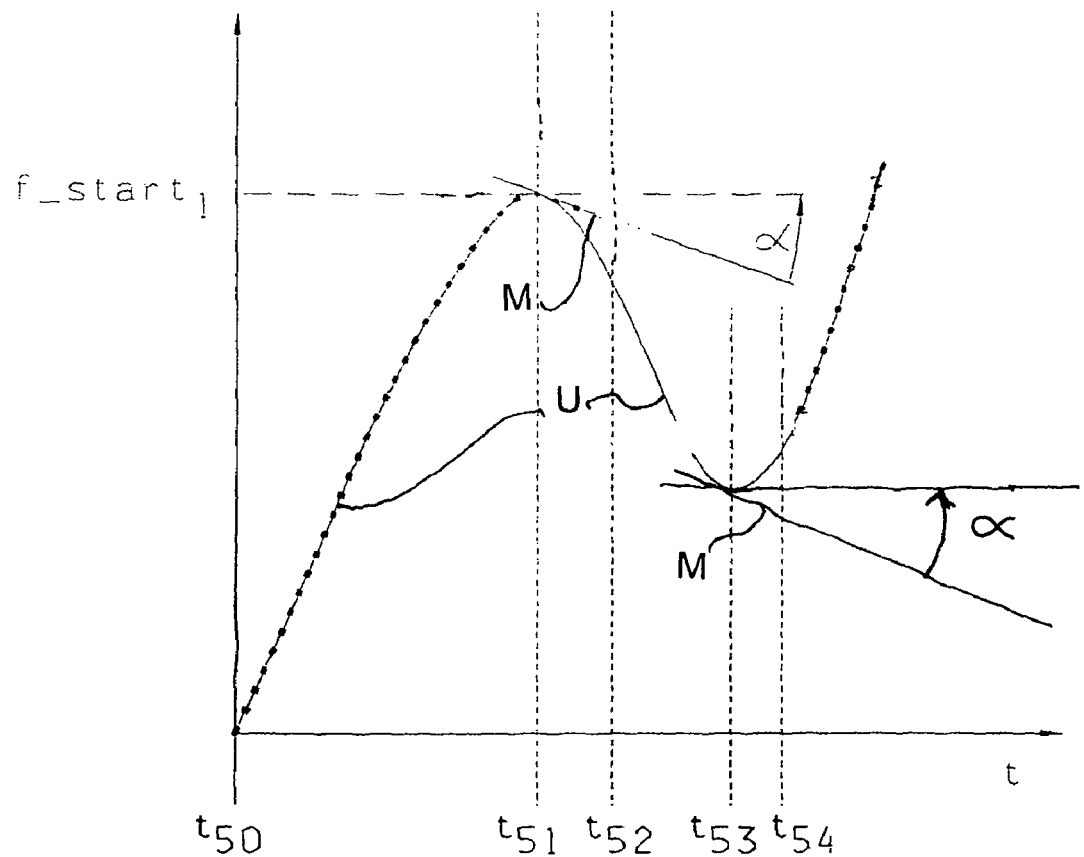
FIGS. 5 to 7 show corresponding signal curves in a second transfer function.

The signal curve, shown in FIG. 5, is based on another transfer function in which the modified accelerator pedal signal value, beginning with the starting value $f_{13}$ start1, drops linearly with a presettable gradient a when the modified accelerator pedal signal value is greater than the unmodified accelerator pedal signal value and the difference between the two accelerator pedal signal values is smaller than the maximum positive divergence 22. At the moment t_52 is reached, this maximum positive divergence 22 of the modified accelerator pedal signal value vis-a-vis the unmodified accelerator pedal signal value. During the phase between the moments t_52 and t_53, the modified accelerator pedal signal value is determined by the sum of the unmodified accelerator pedal signal value and the maximum positive divergence. In the phase between the moments t_53 and t_54, there always prevails a positive divergence which, in turn, drops linearly with the gradient a until at the moment t_54, the modified accelerator pedal signal value is again equal to the unmodified accelerator pedal signal value.

Figure 6:
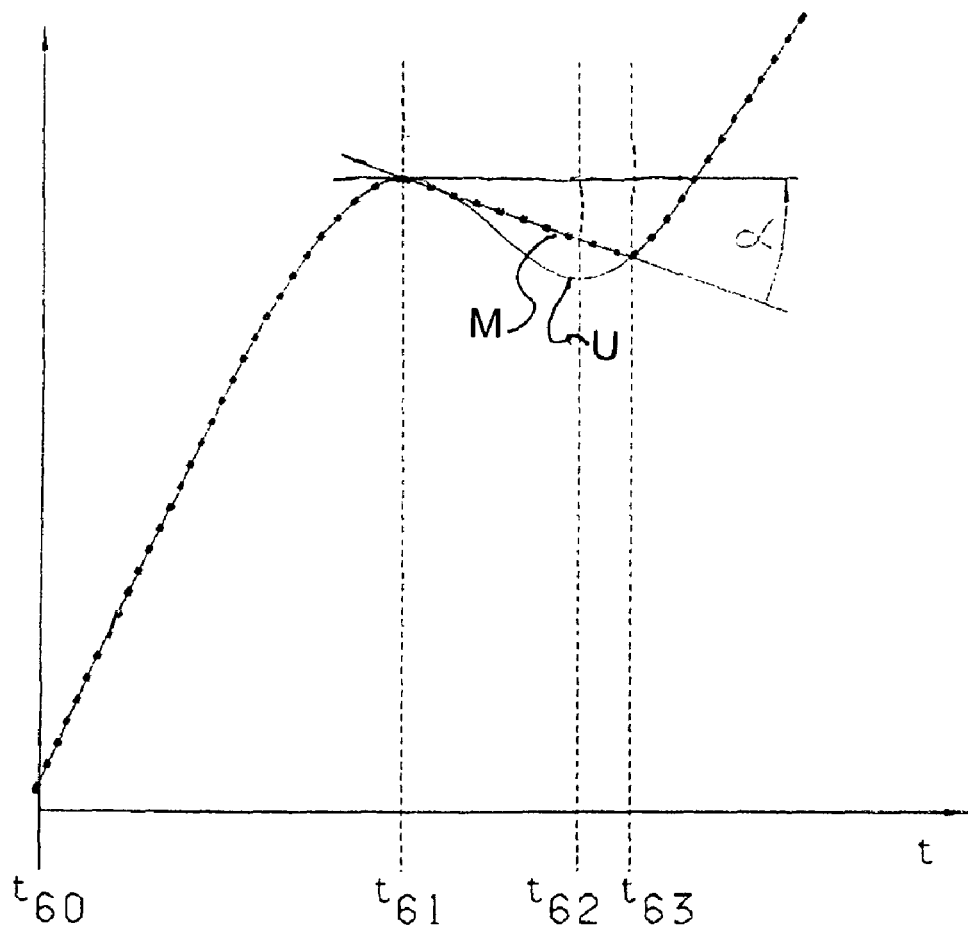

The signal curve, shown in FIG. 6, differs from the signal curve shown in FIG. 5 by the fact that, in the phase between the moments t_61 and t_63, the positive divergence of the modified accelerator pedal signal value remains smaller than the maximum positive divergence 22. While the modified accelerator pedal signal value diverges from the unmodified accelerator pedal signal value, the modified accelerator pedal signal value drops linearly with the gradient $\alpha$.

Figure 7:
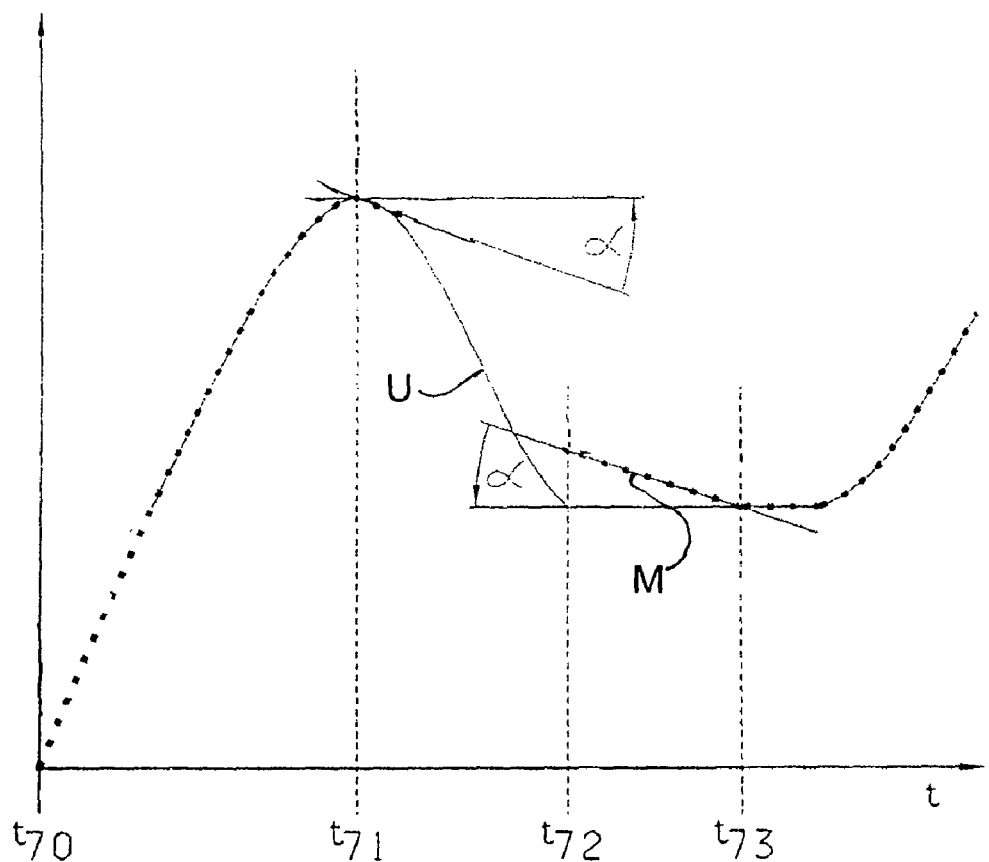

Finally, FIG. 7 shows a signal curve in which, between the moments t_72 and t_73, the accelerator pedal is kept constant by the driver. The positive divergence existing at the moment t_72 is reduced until the moment t_73 by the modified accelerator pedal signal value dropping linearly with the gradient α to the maximum negative divergence 24.

The invention claimed is:

1. A method of controlling a variator ratio for a single stage continuously variable automatic transmission at any point across an entire range of the variator ratio, the method comprising the steps of:
    determining a change in a value of an accelerator pedal signal;
    feeding to an electronic transmission control an accelerator pedal signal corresponding to the movement of the accelerator pedal;
    determining a modified accelerator pedal signal from the accelerator pedal signal in the electronic transmission control;
    adjusting the variator ratio according to the modified accelerator pedal signal by the steps of;
        testing whether a periodic curve of the accelerator pedal signal has a change in slope;
        maintaining the modified accelerator pedal signal at a value equal to the unmodified accelerator pedal signal where a change in slope is not detected, and
        detecting a change in slope of the periodic curve and assigning a starting value (f_start1) to the modified accelerator pedal signal where the change in slope is detected, and determining the modified accelerator pedal signal according to a transfer function until the value of the modified accelerator pedal signal is the same as the value of the unmodified accelerator pedal signal.

2. The method according to claim 1, wherein the modified accelerator pedal signal value determined by the transfer function is not greater than a sum of the unmodified accelerator pedal signal value and a maximum positive divergence of the modified accelerator pedal signal value with respect to the unmodified accelerator pedal signal value and not smaller than a sum of the unmodified accelerator pedal signal value and a maximum negative divergence of the modified accelerator pedal signal value with respect to the unmodified accelerator pedal signal value.

3. The method according to claim 2, further comprising the step of determining the modified accelerator pedal signal value by the transfer function, beginning with the starting value, and changing monotonically in a direction of the unmodified accelerator pedal signal value until the modified accelerator pedal signal value is equal to the unmodified accelerator signal value.

4. The method according to claim 3, further comprising the step of dropping the modified accelerator pedal signal value linearly with a presettable gradient (α) when the modified accelerator pedal signal value is greater than the unmodified accelerator pedal signal value and a difference between the two accelerator pedal signal values is smaller than the maximum positive divergence.

5. The method according to claim 1, further comprising the step of setting the modified accelerator pedal signal value, determined by the transfer function, equal to the starting value until one of a maximum positive or a maximum negative divergence is reached or until the unmodified accelerator pedal signal value is equal to the starting value.

6. The method according to claim 5, further comprising the step of, when one of the maximum positive or the maximum negative divergence is reached, setting the modified accelerator pedal signal value equal to the unmodified accelerator pedal signal value.

* * * * *